United States Patent
Gu et al.

(10) Patent No.: US 10,921,671 B2
(45) Date of Patent: Feb. 16, 2021

(54) PIXEL CIRCUIT, LIQUID CRYSTAL DISPLAY DEVICE AND WEARABLE DEVICE

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Honggang Gu, Beijing (CN); Xianjie Shao, Beijing (CN); Fei Zhao, Beijing (CN)

(73) Assignees: HEFEI BOE OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/459,226

(22) Filed: Jul. 1, 2019

(65) Prior Publication Data
US 2020/0004070 A1   Jan. 2, 2020

(30) Foreign Application Priority Data

Jul. 2, 2018 (CN) .......................... 201810709207.4

(51) Int. Cl.
*G09G 3/36* (2006.01)
*G02F 1/1368* (2006.01)
(Continued)

(52) U.S. Cl.
CPC .......... *G02F 1/1368* (2013.01); *G02F 1/1365* (2013.01); *G04G 9/12* (2013.01); *G09G 3/3696* (2013.01)

(58) Field of Classification Search
None
See application file for complete search history.

(56) References Cited

U.S. PATENT DOCUMENTS

2013/0063499 A1* 3/2013 Tanaka ................. G09G 3/3648
345/690
2015/0097792 A1  4/2015 Yoshida
(Continued)

FOREIGN PATENT DOCUMENTS

CN    205122159 U    3/2016
CN    107403611 A    11/2017
(Continued)

OTHER PUBLICATIONS

First Office Action issued in corresponding Chinese Application No. 201810709207.4, dated Apr. 2, 2020, with English language translation.

*Primary Examiner* — Stephen T. Reed
(74) *Attorney, Agent, or Firm* — McDermott Will and Emery LLP

(57) ABSTRACT

A pixel circuit includes a scanning signal terminal configured to receive a scanning signal, a data voltage terminal configured to receive a data voltage signal, a switching sub-circuit coupled to the scanning signal terminal and the data voltage terminal, and a latch sub-circuit coupled to the switching sub-circuit. The switching sub-circuit is configured to transmit the data voltage signal to the latch sub-circuit in response to receiving the scanning signal. The latch sub-circuit is configured to latch the data voltage signal to generate a first latch signal in a first display period and a second latch signal in a second display period.

8 Claims, 5 Drawing Sheets

(51) Int. Cl.
*G02F 1/1365* (2006.01)
*G04G 9/12* (2006.01)

(56) References Cited

U.S. PATENT DOCUMENTS

2017/0052638 A1   2/2017   Yoshida
2019/0096354 A1   3/2019   Chen et al.

FOREIGN PATENT DOCUMENTS

CN   108198537 A   6/2018
JP   2015096935 A   5/2015

* cited by examiner

PIXEL CIRCUIT, LIQUID CRYSTAL DISPLAY DEVICE AND WEARABLE DEVICE

CROSS-REFERENCE TO RELATED APPLICATION

This application claims priority to Chinese Patent Application No. 201810709207.4, filed with the Chinese Patent Office on Jul. 2, 2018, titled "PIXEL MEMORY CIRCUIT, LIQUID CRYSTAL DISPLAY DEVICE AND WEARABLE DEVICE", which is incorporated herein by reference in its entirety.

TECHNICAL FIELD

The present disclosure relates to the field of display technologies, and in particular, to a pixel circuit, a liquid crystal display device and a wearable device.

BACKGROUND

Liquid crystal display (LCD) panel includes a plurality of pixels, and each pixel includes a plurality of sub-pixels, in a case where at least one sub-pixel includes a circuit having function of memory-in-pixel (MIP), the power consumption of the LCD panel may be effectively reduced, so as to realize the application of the LCD panel in the field of wearable devices.

SUMMARY

In one aspect, a pixel circuit is provided. The pixel circuit includes a scanning signal terminal configured to receive a scanning signal, a data voltage terminal configured to receive a data voltage signal, a switching sub-circuit coupled to the scanning signal terminal and the data voltage terminal, and a latch sub-circuit coupled to the switching sub-circuit.

The switching sub-circuit is configured to transmit the data voltage signal to the latch sub-circuit in response to receiving the scanning signal.

The latch sub-circuit is configured to latch the data voltage signal to generate a first latch signal in a first display period and a second latch signal in a second display period.

In some embodiments, the switching sub-circuit includes at least one transistor, a type of each of which is an N-type. The latch sub-circuit includes at least one transistor, a type of each of which is an N-type.

In some embodiments, the pixel circuit further includes a pixel electrode coupled to the latch sub-circuit. The latch sub-circuit is further configured to transmit the first latch signal to the pixel electrode in the first display period, and transmit the second latch signal to the pixel electrode in the second display period.

In some embodiments, the at least one transistor of the latch sub-circuit includes a first transistor, a second transistor, a third transistor, and a fourth transistor; the latch sub-circuit further includes a power terminal, a grounded terminal, a first node, and a second node.

A control electrode and a first electrode of the first transistor are coupled to the power terminal, and a second electrode of the first transistor is coupled to the second node.

A control electrode and a second electrode of the second transistor are coupled to the first node, and a first electrode of the second transistor is coupled to the power terminal.

A control electrode of the third transistor is coupled to the first node, a first electrode of the third transistor is coupled to the second node, and a second electrode of the third transistor is coupled to the grounded terminal.

A control electrode of the fourth transistor is coupled to the second node, a first electrode of the fourth transistor is coupled to the grounded terminal, and a second electrode of the fourth transistor is coupled to the first node.

In some embodiments, the pixel circuit further includes a pixel electrode coupled to the first node.

In some embodiments, the latch sub-circuit further includes a capacitor. One electrode of the capacitor is coupled to the first node, and another electrode of the capacitor is coupled to the grounded terminal.

In some embodiments, the at least one transistor of the switching sub-circuit includes a fifth transistor. A control electrode of the fifth transistor is coupled to the scanning signal terminal, a first electrode of the fifth transistor is coupled to the data voltage terminal, and a second electrode of the fifth transistor is coupled to the latch sub-circuit.

In some embodiments, the pixel circuit further includes a first input terminal configured to receive a first adjustment signal, a second input terminal configured to receive a second adjustment signal, a pixel electrode, and a gray scale adjustment sub-circuit coupled to the first input terminal, the second input terminal, the pixel electrode, and the latch sub-circuit.

The gray scale adjustment sub-circuit is configured to transmit the first adjustment signal to the pixel electrode under control of the first latch signal, and transmit the second adjustment signal to the pixel electrode under control of the second latch signal.

In some embodiments, the gray scale adjustment sub-circuit includes at least one transistor, a type of each of which is an N-type.

In some embodiments, the at least one transistor of the gray scale adjustment sub-circuit includes a sixth transistor and a seventh transistor.

In some embodiments, the first display period is a bright state display period, and the first latch signal is a high level signal; and the second display period is a dark state display period, and the first latch signal is a low level signal.

A control electrode of the sixth transistor is coupled to the latch sub-circuit, a first electrode of the sixth transistor is coupled to the first input terminal, and a second electrode of the sixth transistor is coupled to the pixel electrode; and A control electrode of the seventh transistor is coupled to the latch sub-circuit, a first electrode of the seventh transistor is coupled to the second input terminal, and a second electrode of the seventh transistor is coupled to the pixel electrode.

In another aspect, a liquid crystal display device is provided. The liquid crystal display device includes at least one pixel circuit as described in some embodiments above.

In yet another aspect, a wearable device is provided. The wearable device includes at least one liquid crystal display device as described in some embodiments above.

BRIEF DESCRIPTION OF THE DRAWINGS

In order to describe technical solutions in embodiments of the present disclosure more clearly, the accompanying drawings to be used in the description of disclosure will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

The technical solutions in some embodiments of the present disclosure will be described clearly and completely with reference to the accompanying drawings in some embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1:
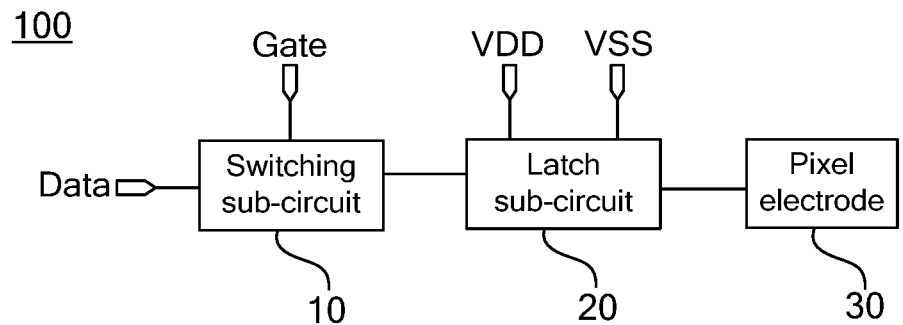
FIG. 1 is a schematic diagram of a pixel circuit, in accordance with some embodiments of the present disclosure.

Some embodiments of the present disclosure provide a pixel circuit. Referring to FIG. 1, the pixel circuit includes a scanning signal terminal Gate configured to receive a scanning signal, a data voltage terminal Data configured to receive a data voltage signal, a switching sub-circuit 10 coupled to the scanning signal terminal Gate and the data voltage terminal Data, and a latch sub-circuit 20 coupled to the switching sub-circuit 10. The switching sub-circuit 10 is configured to transmit the data voltage signal to the latch sub-circuit 20 in response to receiving scanning signal. The latch sub-circuit 20 is configured to latch the data voltage signal to generate a first latch signal in a first display period and a second latch signal in a second display period.

In addition, the switching sub-circuit 10 includes at least one transistor, a type of each of which is an N-type, and the latch sub-circuit 20 includes at least one transistor, a type of each of which is an N-type. That is, the least one transistor of the switching sub-circuit 10 and the least one transistor of the latch sub-circuit 20 are all N-type transistors. Therefore, in some embodiments, transistors of the pixel circuit are all N-type transistors, which is convenient for uniformly designing a structure of a semiconductor layer in each of the transistors. For example, semiconductor layers of the transistors have the same structure, thereby effectively reducing the design difficulty of the pixel circuit, simplifying the production process of the pixel circuit, and reducing the production cost of the pixel circuit.

In a case where a LCD device includes at least one of the above pixel circuit, each pixel circuit is generally disposed in a corresponding sub-pixel of sub-pixels of the LCD device. The first display period and the second display period are differents period respectively, which respectively correspond to different display states of a sub-pixel where the pixel circuit is located.

For example, the first display period is a period when a sub-pixel realizes a bright state display, and the second display period is a period when a sub-pixel realizes a dark state display.

In some embodiments, the pixel circuit further includes a pixel electrode 30 coupled to the latch sub-circuit 20, and the latch sub-circuit 20 is further configured to transmit the first latch signal to the pixel electrode 30 in the first display period and transmit the second latch signal to the pixel electrode 30 in the second display period.

That is, in the first display period, the latch sub-circuit 20 generates the first latch signal and transmits the first latch signal to the pixel electrode 30, so that a deflection state of liquid crystal molecules (that is, electrolytes) in a corresponding sub-pixel can be controlled by using of the first latch signal, so as to realize a display of the corresponding sub-pixel in the first display period (e.g., a bright state display). In the second display period, the latch sub-circuit 20 generates the second latch signal and transmits the second latch signal to the pixel electrode 30, so that another deflection state of the liquid crystal molecules in the corresponding sub-pixel can be controlled by using of the second latch signal, so as to realize a display of the corresponding sub-pixel in the second display period (e.g., a dark state display).

Thus, the first latch signal and the second latch signal are generally two different level signals. For example, the first latch signal is a high level signal and the second latch signal is a low level signal.

In addition, the liquid crystal molecules in each sub-pixel are usually located within the range of an electric field formed by a pixel electrode 30 and a common electrode 40 of a corresponding sub-pixel. By changing at least one of signals respectively applied to the pixel electrode 30 and the common electrode 40 in the same sub-pixel, a molecular arrangement of the liquid crystal molecules in this sub-pixel can be changed, that is, a deflection state of the liquid crystal molecules can be changed.

For example, the signal applied to the common electrode 40 is usually a constant low level signal, in this way, the deflection state of the liquid crystal molecules in a sub-pixel can be changed only by changing the signal applied to the pixel electrode 30 in the same sub-pixel.

In some embodiments, the scanning signal terminal Gate includes a node, a port or a wire, which is configured to coupled the switching sub-circuit 10 and a component configured to provide the scanning signal. The data voltage terminal Data includes a node, a port or a wire, which is configured to coupled the switching sub-circuit 10 and a component configured to provide a data voltage signal.

For example, the scanning signal terminal Gate is a gate line coupled to a corresponding switching sub-circuit 10, and a scanning signal transmitted by the scanning signal terminal Gate is a line scanning signal transmitted by the gate line. The data voltage terminal Data is a data line coupled to the corresponding switching sub-circuit 10, and a data voltage signal transmitted by the data voltage terminal Data is a data voltage signal transmitted by the data line.

In some embodiments, the switching sub-circuit 10 transmits a data voltage signal transmitted by the data voltage terminal Data to the latch sub-circuit 20 under the control of a corresponding scanning signal. The data voltage signal can be latched by the latch sub-circuit 20, and a first latch signal is generated in the first display period according to the data voltage signal, so as to control a display state of a corresponding sub-pixel in the first display period. The data voltage signal can be latched by the latch sub-circuit 20, and a second latch signal is generated in the second display period according to the data voltage signal, so as to control a display state of a corresponding sub-pixel in the second display period. Latching the data voltage signal by using of the latch sub-circuit 10 is advantageous for realizing a display of a corresponding sub-pixel under a low frequency driving (for example, 1 Hz). Moreover, the latch sub-circuit 10 generates different latch signals in different display periods respectively, which can effectively prevent the LCD device including the pixel circuit from leaking under low frequency driving.

Some embodiments of the present disclosure do not limit the structure of the latch sub-circuit 20, as long as the data voltage signal may be latched, and the first latch signal and the second latch signal are respectively generated according to the data voltage signal.

In some embodiments, the latch sub-circuit 20 includes a static random access memory (SRAM). The SRAM is configured to latch a data voltage signal transmitted by the data voltage terminal Data in response to receiving a scanning signal transmitted by the scanning signal terminal Gate, as a result, a pixel electrode 30 of the sub-pixel including the SRAM can be charged or discharged according to the latched data voltage signal of the SRAM. In addition, for example, the signal storage of the SRAM is implemented by a visible light communication (VLC) technology.

Figure 2:
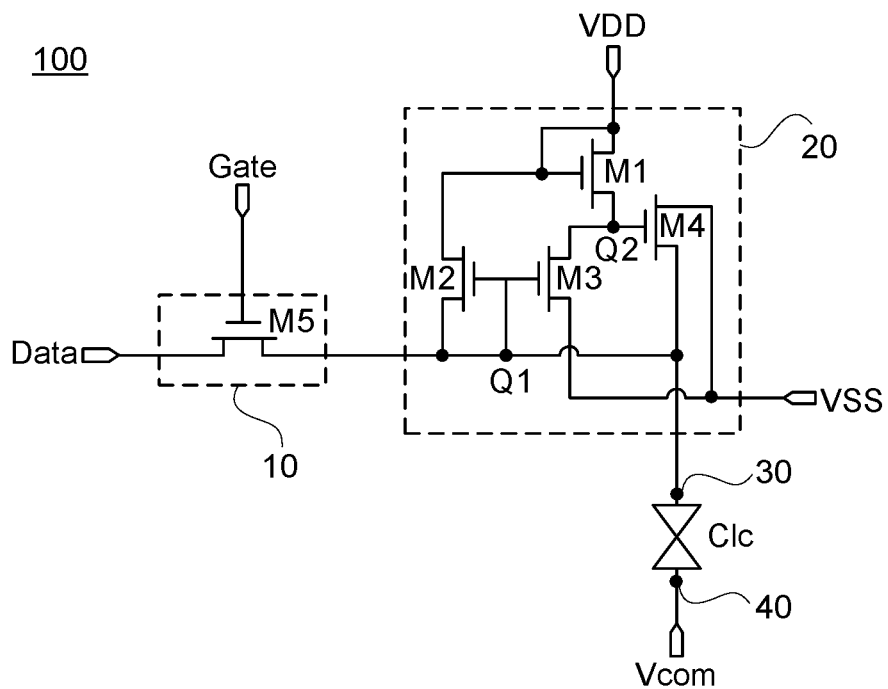
FIG. 2 is a schematic diagram of another pixel circuit, in accordance with some embodiments of the present disclosure.

In some another embodiments, referring to FIG. 2, the at least one transistor of the latch sub-circuit 20 includes a first transistor M1, a second transistor M2, a third transistor M3, and a fourth transistor M4.

The latch sub-circuit 20 further includes a power terminal VDD, a grounded terminal VSS, a first node Q1, and a second node Q2.

A control electrode and a first electrode of the first transistor M1 are coupled to the power terminal VDD, and a second electrode of the first transistor M1 is coupled to the second node Q2. A control electrode and a second electrode of the second transistor M2 are coupled to the first node Q1, and a first electrode of the second transistor M2 is coupled to the power terminal VDD. A control electrode of the third transistor M3 is coupled to the first node Q1, a first electrode of the third transistor M3 is coupled to the second node Q2, and a second electrode of the third transistor M3 is coupled to the grounded terminal VSS. A control electrode of the fourth transistor M4 is coupled to the second node Q2, a first electrode of the fourth transistor M4 is coupled to the grounded terminal VSS, and a second electrode of the fourth transistor M4 is coupled to the first node Q1.

Referring to FIG. 2, the at least one transistor of the switching sub-circuit 10 includes a fifth transistor M5. A control electrode of the fifth transistor M5 is coupled to the scanning signal terminal Gate, a first electrode of the fifth transistor M5 is coupled to the data voltage terminal Data, and a second electrode of the fifth transistor M5 is coupled to the first node Q1 of the latch sub-circuit 20.

In a case where the latch sub-circuit 20 has a structure as shown in FIG. 2, the pixel electrode 30 in the pixel circuit is coupled to the first node Q1. In this case, in the first display period, the latch sub-circuit 20 transmits the first latch signal to the pixel electrode 30 through the first node Q1, as a result, an electric field formed by the pixel electrode 30 and the common electrode 40 in the sub-pixel including the pixel circuit can control the liquid crystal molecules in this sub-pixel to deflect to a corresponding state, so as to realize a display of this sub-pixel in the first display period. In the second display period, the latch sub-circuit 20 transmits the second latch signal to the pixel electrode 30 through the first node Q1, as a result, an electric field formed by the pixel electrode 30 and the common electrode 40 of in the sub-pixel including the pixel circuit can control the liquid crystal molecules in this sub-pixel to deflect to a corresponding state, so as to realize a display of this sub-pixel in the second display period. In addition, in each sub-pixel, the pixel electrode 30, the common electrode 40, and the liquid crystal molecules located bewteen the pixel electrode 30 and the common electrode 40 are configured to together provide a liquid crystal storage capacitance Clc.

Figure 3:
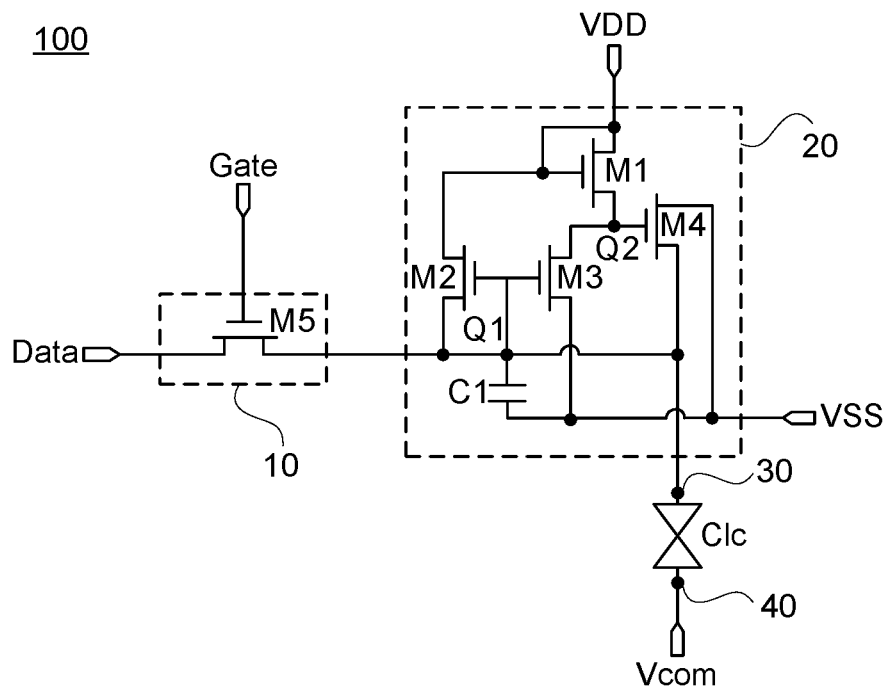
FIG. 3 is a schematic diagram of yet another pixel circuit, in accordance with some embodiments of the present disclosure.

Based on this, in yet another embodiments, referring to FIG. 3, the latch sub-circuit 20 further includes a capacitor C1. One electrode of the capacitor C1 is coupled to the first node Q1, and another electrode of the capacitor C1 is coupled to the grounded terminal VSS. In this case, by using the first capacitor C1 to store a potential of the first node Q1, it is possible to ensure that the potential of the first node Q1 is maintained in a stable state during a required period, thereby reducing the power consumption of the latch sub-circuit 20 and the power consumption of the pixel circuit.

In order to clearly explain the working process of the pixel circuit in some embodiments, the following description is made by taking the structure of the pixel circuit as shown in FIG. 2 or 3 as an example.

Figure 4:
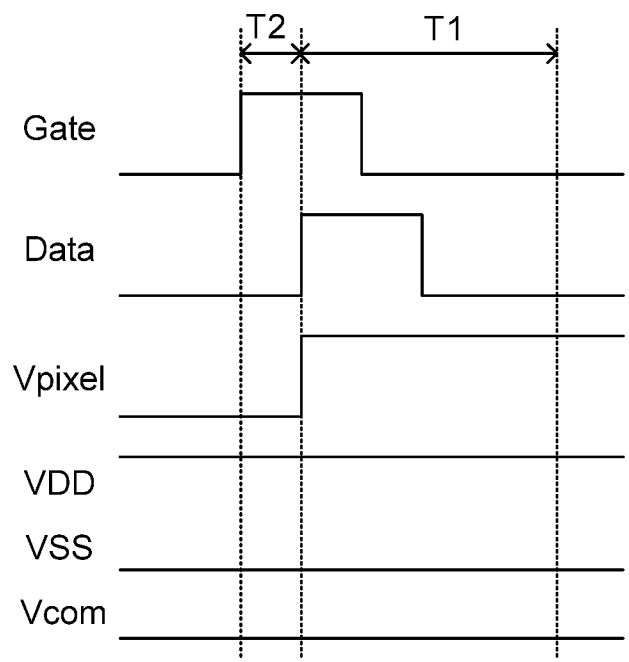
FIG. 4 is a timing control diagram of signals configured to drive the pixel memory circuit shown in FIG. 2 or FIG. 3.

Referring to FIG. 4, the power terminal VDD transmits a constant high level signal, the grounded terminal VSS transmits a constant low level signal, and the common voltage terminal Vcom transmits a constant low level signal.

In the first display period T1, the switching sub-circuit 10 is controlled to be turned on through a high level signal transmitted by the scanning signal terminal Gate, that is, the fifth transistor M5 is controlled to be turned on. A high level signal transmitted by the data voltage terminal Data is transmit to the first node Q1 in the latch sub-circuit 20 through the fifth transistor M5. In a case where the latch sub-circuit 20 includes the capacitor C1, the capacitor C1 stores the high level signal transmitted by the data voltage terminal Data. In this case, the high level signal transmit to the first node Q1 controls the third transistor M3 and the second transistor M2 to be turned on. After the third transistor M3 is turned on, a low level signal transmitted by the grounded terminal VSS is transmit to the second node Q2 through the third transistor M3, and the fourth transistor M4 is controlled to be turned off. Since the second node Q2 is a connection node between the third transistor M3 and the first transistor M1, and a high level signal transmitted by the power terminal VDD controls the first transistor M1 to be turned on. Therefore, after structures of the third transistor M3 and the first transistor M1 are preset according to actual needs, and the potential of the second node Q2 may be ensured to be a low potential in the first display period. After the second transistor M2 is turned on, and a high level signal transmitted by the power terminal VDD is continuously transmit to the pixel electrode 30 through the second transistor M2 as the first latch signal, so that an electric field formed by the pixel electrode 30 and the corresponding common electrode 40 controls the liquid crystal molecules in the corresponding sub-pixel to deflect to a corresponding state, so as to realize a display of this sub-pixel in the first display period.

In the second display period T2, the switching sub-circuit 10 is controlled to be turned on through a high level signal transmitted by the scanning signal terminal Gate, that is, the fifth transistor M5 is controlled to be turned on. A low level signal transmitted by the data voltage terminal Data is transmit to the first node Q1 in the latch sub-circuit 20 through the fifth transistor M5. In a case where the latch sub-circuit 20 includes the capacitor C1, the capacitor C1 stores the low level signal transmitted by the data voltage terminal Data. In this case, the low level signal transmit to the first node Q1 controls the third transistor M3 and the second transistor M2 to be turned off, and a high level signal transmitted by the power terminal VDD controls the first transistor M1 to be turned on. The high level signal transmitted by the power terminal VDD is transmit to the second node Q2 through the first transistor M1, and controls the fourth transistor M4 to be turned on. The low level signal transmitted by the grounded terminal VSS is continuously transmit to the pixel electrode 30 through the fourth transistor M4 as the second latch signal. so that another electric field formed by the pixel electrode 30 and the corresponding common electrode 40 controls the liquid crystal molecules in the corresponding sub-pixel to deflect to another corresponding state, so as to realize a display of this sub-pixel in the second display period.

In summary, in some embodiments of the present disclosure, by using of the first latch signal generated by the latch sub-circuit 20 of the pixel circuit, the pixel circuit can provide a continuous high level signal for the pixel electrode 30 in the first display period to control the corresponding sub-pixel to achieve a display in the first display period (e.g., a bright state display) and maintain the display until the next frame display signal. By using of the second latch signal generated by the latch sub-circuit 20 of the pixel circuit, the pixel circuit can provide a continuous low level signal for the pixel electrode 30 in the second display period to control the corresponding sub-pixel to achieve another display in the second display period (e.g., a dark state display) and maintain the display until the next frame display signal.

Figure 5:
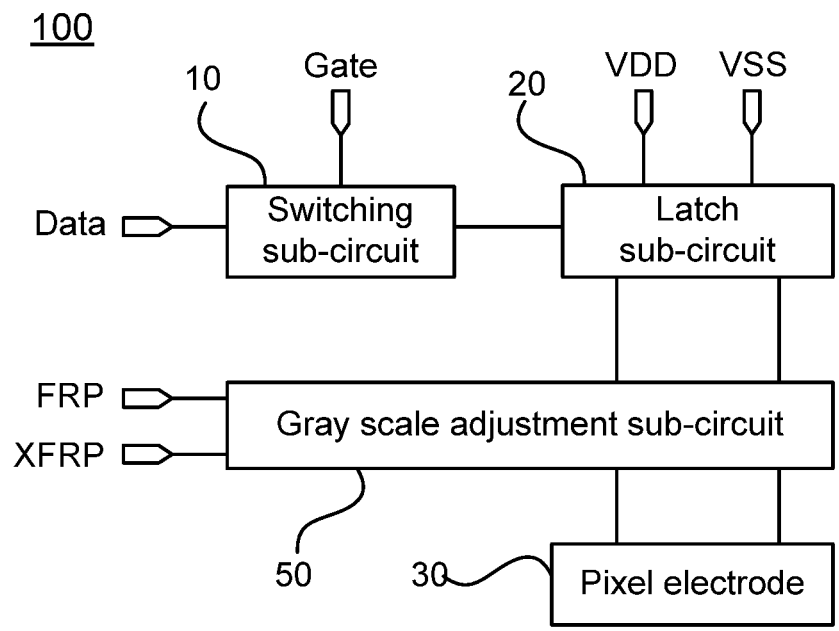
FIG. 5 is a schematic diagram of yet another pixel circuit, in accordance with some embodiments of the present disclosure.

In some embodiments, as shown in FIG. 5, the pixel circuit further includes a first input terminal FRP, a second input terminal XFRP, and a gray scale adjustment sub-circuit 50. The latch sub-circuit 20 in the pixel circuit is coupled to the pixel electrode 30 through the gray scale adjustment sub-circuit 50, and the gray scale adjustment sub-circuit 50 is further coupled to the first input terminal FRP and the second input terminal XFRP. The gray scale adjustment sub-circuit 50 is configured to transmit a first adjustment signal transmitted by the first input terminal FRP to the pixel electrode 30 under the control of the first latch signal generated by the latch sub-circuit 20 and transmit a second adjustment signal transmitted by the second input terminal XFRP to the pixel electrode 30 under the control of the second latch signal generated by the latch sub-circuit 20.

The latch sub-circuit 20 in the pixel circuit is coupled to the pixel electrode 30 through the gray scale adjustment sub-circuit 50, and the gray scale of a corresponding sub-pixel may be effectively adjusted by the gray scale adjustment sub-circuit 50. Here, the first adjustment signal transmitted by the first input terminal FRP is configured to adjust a gray scale change of the corresponding sub-pixel in the first display period. The first adjustment signal is not a constant signal, and needs to be changed according to the value of the gray scale adjusted by the corresponding sub-pixel. The second adjustment signal transmitted by the second input terminal XFRP is configured to adjust a gray scale change of the corresponding sub-pixel in the second display period. The second adjustment signal is not a constant signal, and needs to be changed according to the value of the gray scale adjusted by the corresponding sub-pixel. Of course, if it is not necessary to adjust the gray scale of the sub-pixel in the first display period, the first adjustment signal transmitted by the corresponding first input terminal FRP is a constant signal, which is also allowed. Similarly, if it is not necessary to adjust the gray scale of the sub-pixel in the second display period, the second adjustment signal transmitted by the corresponding second input terminal XFRP is a constant signal, which is also allowed. Some embodiments of the present disclosure do not limit this.

In some embodiments, the gray scale adjustment sub-circuit 50 includes at least one transistor, a type of each of which is an N-type. That is, each transistor of the gray scale adjustment sub-circuit 50 is an N-type transistor. Therefore, in a case where the pixel circuit further includes the gray scale adjustment sub-circuit 50, all transistor in the pixel circuit are all N-type transistors, which is convenient for further uniformly designing the structure of a semiconductor layer in each transistor. For example, semiconductor layers of the transistors have the same structure, thereby further reducing the design difficulty of the pixel circuit and simplifying the production process of the pixel circuit, and further reducing the production cost of the pixel circuit.

Figure 6:
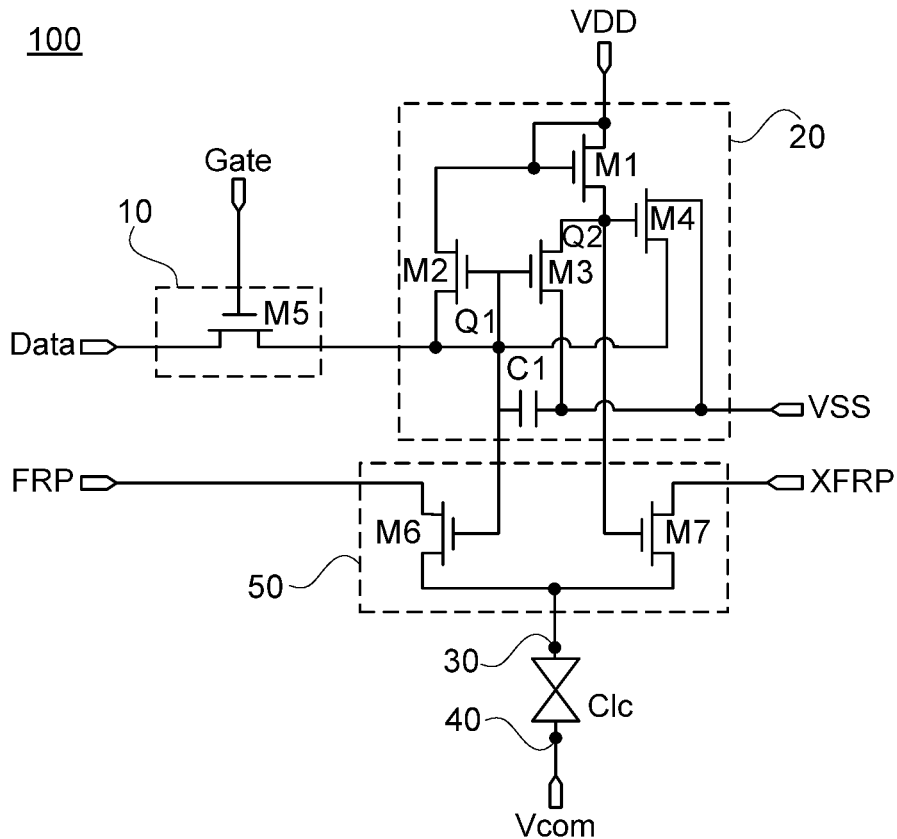
FIG. 6 is a schematic diagram of yet another pixel circuit, in accordance with some embodiments of the present disclosure.

In some embodiments, as shown in FIG. 6, the at least one transistor of the gray scale adjustment sub-circuit 50 includes a sixth transistor M6 and a seventh transistor M7. A control electrode of the sixth transistor M6 is coupled to the first node Q1 of the latch sub-circuit 20, a first electrode of the sixth transistor M6 is coupled to the first input terminal FRP, and a second electrode of the sixth transistor M6 is coupled to the pixel electrode 30. A control electrode of the seventh transistor M7 is coupled to the second node Q2 of the latch sub-circuit 20, a first electrode of the seventh transistor M7 is coupled to the second input terminal XFRP, and a second electrode of the seventh transistor M7 is coupled to the pixel electrode 30.

Figure 7:
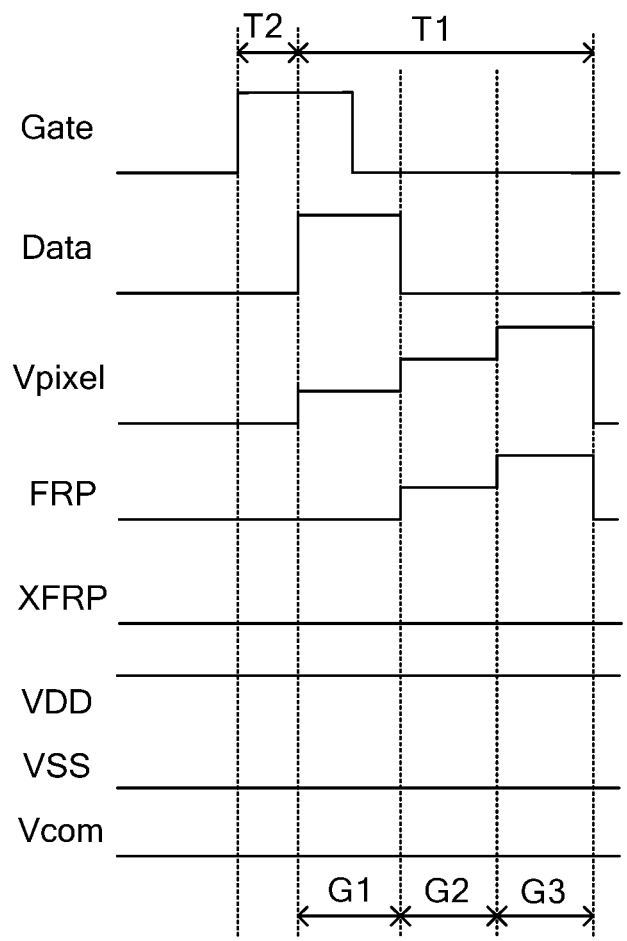
FIG. 7 is a timing control diagram of signals configured to drive the pixel circuit shown in FIG. 6.

Referring to FIGS. 6 and 7, in a case where the pixel circuit has the structure shown in FIG. 6, the power terminal VDD transmits a constant high level signal, the grounded terminal VSS transmits a constant low level signal, and the common voltage terminal Vcom transmits a constant low level signal.

Here, in some embodiments, the constant low level signal transmitted by the grounded terminal VSS and the constant low level signal transmitted by the common voltage terminal Vcom are the same constant low level signal; in some other embodiments, the constant low level signal transmitted by the grounded terminal VSS and the constant low level signal transmitted by the common voltage terminal Vcom are different constant low level signals.

In the first display period T1, the switching sub-circuit 10 is controlled to be turned on through a high level signal transmitted by the scanning signal terminal Gate, that is, the fifth transistor M5 is controlled to be turned on. The high level signal transmitted by the data voltage terminal Data is transmit to the first node Q1 in the latch sub-circuit 20 through the fifth transistor M5. In a case where the latch sub-circuit 20 includes the capacitor C1, the capacitor C1 stores the high level signal transmitted by the data voltage terminal Data. In this case, the high level signal transmit to the first node Q1 controls the third transistor M3 and the second transistor M2 to be turned on. After the third transistor M3 is turned on, a low level signal transmitted by the grounded terminal VSS is transmit to the second node Q2 through the third transistor M3, and the fourth transistor M4 and the seventh transistor M7 are controlled to be turned off. Since the second node Q2 is a connection node between the third transistor M3 and the first transistor M1, the high level signal transmitted by the power terminal VDD controls the first transistor M1 to be turned on. Therefore, after structures of the third transistor M3 and the first transistor M1 are preset according to actual needs, and the potential of the second node Q2 may be ensured to be a low potential in the first display period. After the second transistor M2 is turned on, and a high level signal transmitted by the power terminal VDD is transmit to the sixth transistor M6 through the second transistor M2, and the sixth transistor M6 is controlled to be turned on. The first adjustment signal transmitted by the first input terminal FRP is transmit to the pixel electrode 30 through the sixth transistor M6, and an electric field formed by the pixel electrode 30 and the corresponding common electrode 40 controls the liquid crystal molecules in the corresponding sub-pixel to deflect to a corresponding state, so as to realize a display of this sub-pixel in the first display period.

Here, the first adjustment signal transmitted by the first input terminal FRP changes according to the gray scale change required by the corresponding sub-pixel, and the gray scale of the corresponding sub-pixel in the first display period T1 may be effectively adjusted. For example, when the sub-pixel needs to present three different gray scales in the first display period T1 (for example, the first gray scale G1, the second gray scale G2, and the third gray scale G3 shown in FIG. 7), and the first adjustment signal transmitted by the first input FRP will also includes three different level signals, that is, in the first display period T1, the received signal on the pixel electrode (e.g., a pixel voltage Vpixel) are different according to the different gray scales.

In the second display period T2, the switching sub-circuit 10 is controlled to be turned on through a high level signal transmitted by the scanning signal terminal Gate, that is, the fifth transistor M5 is controlled to be turned on. The low level signal transmitted by the data voltage terminal Data is transmit to the first node Q1 in the latch sub-circuit 20 through the fifth transistor M5. In a case where the latch sub-circuit 20 includes the capacitor C1, the capacitor C1 stores the low level signal transmitted by the data voltage terminal Data. In this case, the low level signal transmit to the first node Q1 controls the third transistor M3 and the second transistor M2 to be turned off, and a high level signal transmitted by the power terminal VDD controls the first transistor M1 to be turned on. The high level signal transmitted by the power terminal VDD is transmit to the second node Q2 through the first transistor M3, and controls the fourth transistor M4 and the seventh transistor M7 to be turned on. The second adjustment signal transmitted by the second input terminal XFRP is transmit to the pixel electrode 30 through the seventh transistor M7, and another electric field formed by the pixel electrode 30 and the corresponding common electrode 40 controls the liquid crystal molecules in the corresponding sub-pixel to deflect to a corresponding state, so as to realize a display of this sub-pixel in the second display period.

Here, the second adjustment signal transmitted by the second input terminal XFRP changes according to the gray scale change required by the corresponding sub-pixel, and the gray scale of the corresponding sub-pixel in the second display period T2 may be effectively adjusted. For example, as shown in FIG. 7, if it is not necessary to adjust the gray scale of the sub-pixel in the second display period in the second display period T2, and the second adjustment signal transmitted by the second input terminal XFRP is a constant low level signal.

It will be noted that, in a case where any one of the above transistors of the pixel circuit is a thin film transistor (TFT), the control electrode of the transistor may also be referred to as a gate.

Figure 8:
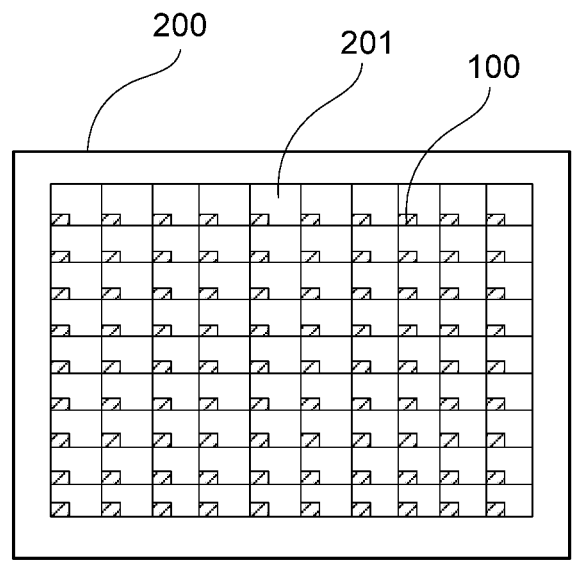
FIG. 8 is a schematic diagram of a liquid crystal display device, in accordance with some embodiments of the present disclosure.

Some embodiments of the present disclosure provide a liquid crystal (LCD) display device. As shown in FIG. 8, the LCD display device 200 includes at least one pixel circuit 100 of some of the above embodiments. The LCD display device has the same advantageous effect as the pixel circuit 100 described above, which will not be described herein again.

In some embodiments, referring to FIG. 8, the LCD display device 200 includes a product or component having a display function such as a LCD panel or a LCD screen. The LCD display device 200 has a plurality of sub-pixels 201 arranged in an array and at least one pixel circuit, and each pixel circuit 100 is provided in a corresponding one sub-pixel 201 of the plurality of pixels 201.

In some embodiments, each sub-pixel 201 includes a corresponding pixel circuit.

In some other embodiments, each sub-pixel 201 of a portion of the plurality of sub-pixels 201 includes a corresponding pixel circuit. The portion of the sub-pixels 201 may be a plurality of sub-pixels 201 arranged in series, or a plurality of sub-pixels 201 arranged at intervals. The number and arrangement of the sub-pixels 201 including the pixel circuits 100 described above may be determined according to the specific leakage protection requirements of the liquid crystal display device. Some embodiments of the present disclosure do not limit this.

Figure 9:
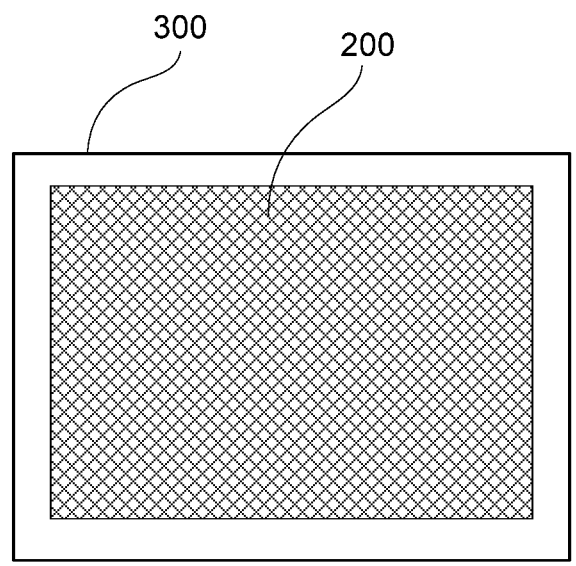
FIG. 9 is a schematic diagram of a wearable device, in accordance with some embodiments of the present disclosure.

Some embodiments of the present disclosure provide a wearable device. As shown in FIG. 9, the wearable device 300 includes at least one LCD display device 200 provided from some of the foregoing embodiments. The wearable device 300 has the same advantageous effect as the LCD display device 200 described above, which will not be described herein again.

Here, in some embodiments, each LCD device 200 in the wearable device is a reflective LCD device for reflecting ambient light to display; in some other embodiments, each LCD device 200 in the wearable device is a transflective LCD device, which can display by reflecting ambient light and light from a backlight module thereof; in some yet other embodiments, in a case where the wearable device includes LCD display devices 200, each of a portion of the LCD devices 200 is a reflective LCD device, and each of the rest of the LCD devices 200 is a transflective LCD device.

Since the reflective or transflective LCD device can display by using reflected ambient light, the LCD device has a low energy consumption, thereby reducing the energy consumption of the wearable device including the LCD display.

In some embodiments, the wearable device 300 is a smart watch, and the display screen of the smart watch is the above LCD screen.

In the above description of the embodiments, specific features, structures, materials or characteristics may be combined in any suitable manner in any one or more embodiments or examples.

The foregoing descriptions are merely specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A pixel circuit, comprising:
a scanning signal terminal configured to receive a scanning signal;
a data voltage terminal configured to receive a data voltage signal;
a switching sub-circuit coupled to the scanning signal terminal and the data voltage terminal; and
a latch sub-circuit coupled to the switching sub-circuit,
wherein the switching sub-circuit is configured to transmit the data voltage signal to the latch sub-circuit in response to receiving the scanning signal; and
the latch sub-circuit is configured to latch the data voltage signal to generate a first latch signal in a first display period and a second latch signal in a second display period;
wherein the latch sub-circuit includes a first transistor, a second transistor, a third transistor, and a fourth transistor; and the latch sub-circuit further includes a power terminal, a grounded terminal, a first node, and a second node, wherein a control electrode and a first electrode of the first transistor are coupled to the power terminal, and a second electrode of the first transistor is coupled to the second node;
a control electrode and a second electrode of the second transistor are coupled to the first node, and a first electrode of the second transistor is coupled to the power terminal;
a control electrode of the third transistor is coupled to the first node, a first electrode of the third transistor is coupled to the second node, and a second electrode of the third transistor is coupled to the grounded terminal; and
a control electrode of the fourth transistor is coupled to the second node, a first electrode of the fourth transistor is coupled to the grounded terminal, and a second electrode of the fourth transistor is coupled to the first node; and
the switching sub-circuit includes at least one transistors;
a first input terminal configured to receive a first adjustment signal;
a second input terminal configured to receive a second adjustment signal;
a pixel electrode; and
a gray scale adjustment sub-circuit coupled to the first input terminal, the second input terminal, the pixel electrode, and the latch sub-circuit,
wherein the gray scale adjustment sub-circuit is configured to transmit the first adjustment signal to the pixel electrode under control of the first latch signal, and transmit the second adjustment signal to the pixel electrode under control of the second latch signal;
wherein the gray scale adjustment sub-circuit includes at least one transistor;
wherein the at least one transistor of the gray scale adjustment sub-circuit includes a sixth transistor and a seventh transistor,
wherein a control electrode of the sixth transistor is coupled to the latch sub-circuit, a first electrode of the sixth transistor is coupled to the first input terminal, and a second electrode of the sixth transistor is coupled to the pixel electrode; and
a control electrode of the seventh transistor is coupled to the latch sub-circuit, a first electrode of the seventh transistor is coupled to the second input terminal, and a second electrode of the seventh transistor is coupled to the pixel electrode;
wherein a type of each of the transistors of the switching sub-circuit, the latch sub-circuit, and the gray scale adjustment sub-circuit is an N-type.

2. The pixel circuit according to claim 1, further comprising a pixel electrode coupled to the latch sub-circuit, wherein
the latch sub-circuit is further configured to transmit the first latch signal to the pixel electrode in the first display period, and transmit the second latch signal to the pixel electrode in the second display period.

3. The pixel circuit according to claim 1, further comprising a pixel electrode coupled to the first node.

4. The pixel circuit according to claim 1, wherein the latch sub-circuit further includes a capacitor, wherein
one electrode of the capacitor is coupled to the first node, and another electrode of the capacitor is coupled to the grounded terminal.

5. The pixel circuit according to claim 1, wherein the at least one transistor of the switching sub-circuit includes a fifth transistor, wherein
a control electrode of the fifth transistor is coupled to the scanning signal terminal, a first electrode of the fifth transistor is coupled to the data voltage terminal, and a second electrode of the fifth transistor is coupled to the latch sub-circuit.

6. The pixel circuit according to claim 1, wherein
the first display period is a bright state display period, and the first latch signal is a high level signal; and
the second display period is a dark state display period, and the first latch signal is a low level signal.

7. A liquid crystal display device, comprising at least one pixel circuit according to claim 1.

8. A wearable device, comprising at least one liquid crystal display device according to claim 7.

* * * * *